United States Patent
Cohen et al.

(10) Patent No.: US 9,350,969 B2
(45) Date of Patent: May 24, 2016

(54) TARGET REGION FILLING INVOLVING SOURCE REGIONS, DEPTH INFORMATION, OR OCCLUSIONS

(71) Applicant: Adobe Systems Incorporated, San Jose, CA (US)

(72) Inventors: Scott D. Cohen, Sunnyvale, CA (US); Brian L. Price, San Jose, CA (US); Bryan Stuart Morse, Mapleton, UT (US); Joel A. Howard, Provo, UT (US)

(73) Assignee: Adobe Systems Incorporated, San Jose, CA (US)

( * ) Notice: Subject to any disclaimer, the term of this patent is extended or adjusted under 35 U.S.C. 154(b) by 315 days.

(21) Appl. No.: 13/866,694

(22) Filed: Apr. 19, 2013

(65) Prior Publication Data

US 2014/0313188 A1    Oct. 23, 2014

(51) Int. Cl.
*H04N 13/00*          (2006.01)

(52) U.S. Cl.
CPC ....... *H04N 13/0011* (2013.01); *H04N 13/0007* (2013.01)

(58) Field of Classification Search
None
See application file for complete search history.

(56) References Cited

U.S. PATENT DOCUMENTS

| | | | |
|---|---|---|---|
| 7,116,323 | B2 | 10/2006 | Kaye et al. |
| 7,327,374 | B2 | 2/2008 | Oh et al. |
| 8,340,463 | B1 | 12/2012 | Cho et al. |
| 8,964,025 | B2 | 2/2015 | Cudak et al. |
| 2003/0026482 | A1 | 2/2003 | Dance |
| 2004/0217975 | A1 | 11/2004 | Oh et al. |
| 2008/0226123 | A1 | 9/2008 | Birtwistle et al. |
| 2008/0238942 | A1 | 10/2008 | Sun et al. |
| 2009/0315978 | A1 | 12/2009 | Wurmlin et al. |
| 2010/0046843 | A1 | 2/2010 | Ma et al. |
| 2010/0208994 | A1 | 8/2010 | Yao et al. |
| 2010/0222671 | A1* | 9/2010 | Cohen ............... G06T 7/0022 600/424 |
| 2010/0228076 | A1* | 9/2010 | Blank ............... G06T 7/0022 600/18 |
| 2010/0290693 | A1* | 11/2010 | Cohen ............... A61B 6/469 382/134 |
| 2010/0296748 | A1 | 11/2010 | Shechtman et al. |
| 2011/0080464 | A1 | 4/2011 | Alessandrini et al. |
| 2011/0273582 | A1 | 11/2011 | Gayko et al. |
| 2012/0242789 | A1 | 9/2012 | Cheng et al. |

(Continued)

FOREIGN PATENT DOCUMENTS

GB      2520613      5/2015

OTHER PUBLICATIONS

Steinbrucker, F.—"Large Displacement Optical Flow Computation without Warping"—IEEE 2009, pp. 1609-1614.*

(Continued)

*Primary Examiner* — Bernard Krasnic
(74) *Attorney, Agent, or Firm* — Wolfe-SBMC

(57) ABSTRACT

Target region filling techniques are described. Techniques are described in which stereo consistency is promoted between target regions, such as by sharing information during computation. Techniques are also described in which target regions of respective disparity maps are completed to promote consistency between the disparity maps. This estimated disparity may then be used as a guide to completion of a missing texture in the target region. Techniques are further described in which cross-image searching and matching is employed by leveraging a plurality of images. This may including giving preference to matches with cross-image consistency to promote consistency, thereby enforcing stereo consistency between stereo images when applicable.

20 Claims, 16 Drawing Sheets

(56) References Cited

U.S. PATENT DOCUMENTS

| | | | |
|---|---|---|---|
| 2012/0257814 | A1 | 10/2012 | Kohli et al. |
| 2013/0051685 | A1* | 2/2013 | Shechtman et al. .......... 382/218 |
| 2013/0128121 | A1 | 5/2013 | Agarwala et al. |
| 2013/0163874 | A1* | 6/2013 | Shechtman et al. .......... 382/190 |
| 2013/0163884 | A1* | 6/2013 | Shechtman et al. .......... 382/203 |
| 2013/0169748 | A1 | 7/2013 | Corral-Soto |
| 2013/0266208 | A1 | 10/2013 | Lim et al. |
| 2013/0314507 | A1 | 11/2013 | Akagi |
| 2014/0085433 | A1 | 3/2014 | Han et al. |
| 2014/0119595 | A1 | 5/2014 | Gallo et al. |
| 2014/0313187 | A1 | 10/2014 | Cohen et al. |
| 2015/0071360 | A1* | 3/2015 | Nguyen et al. ........... 375/240.18 |
| 2015/0097827 | A1 | 4/2015 | Cohen et al. |

OTHER PUBLICATIONS

Basha, et al., "Geometrically consistent stereo seam carving", In: International Conference on Computer Vision. 2011, 8 pages.

Bertalmio, et al., "Simultaneous Structure and Texture Image Inpainting", Proceedings IEEE Conference on Computer Vision and Pattern Recognition, 2003, 13 pages.

Bertalmio, et al., "Image Inpainting", SIGGRAPH '00: Proceedings of the 2ih annual conference on computer graphics and interactive techniques, ACM Press/Addison-Wesley Publishing Co., New York, NY, USA, 2000, 8 pages.

Birchfield, et al., "A Pixel Dissimilarity Measure That Is Insensitive to Image Sampling", IEEE Transactions on Pattern Analysis and Machine Intelligence, Apr. 1998, pp. 401-406.

Cohen, et al., "Wang Tiles for Image and Texture Generation", In Proceedings of SIGGRAPH 2003, Available <http://research.microsoft.com/en-us/um/people/cohen/WangFinal.pdf>,2003, 8 pages.

Criminisi, et al., "Object Removal by Exemplar-Based Inpainting", IEEE Conference on Computer Vision and Pattern Recognition, 2003, 8 pages.

Efros, et al., "Texture Synthesis by Non-parametric Sampling", In: IEEE International Conference on Computer Vision. Sep. 1999, 6 pages.

Egnal, et al., "Detecting Binocular Half-Occlusions: Empirical Comparisons of Five Approaches", IEEE Transactions on Pattern Analysis and Machine Intelligence 24, Aug. 2002, pp. 1127-1133.

Gong, et al., "Fast Stereo Matching Using Reliability-Based Dynamic Programming and Consistency Constraints", In: International Conference on Computer Vision. 2003, 8 pages.

Kwatra, et al., "Texture Optimization for Example-based Synthesis", Retrieved from <http://physbam.stanford.edu/~kwatra/papers/TO/TO-final.pdf> on Nov. 28, 2012, 2005, 8 pages.

Lo, et al., "Stereoscopic 3D Copy & Paste", Proceedings of ACM SIGGRAPH Asia, vol. 29 Issue 6, Article No. 147, Dec. 2010, 10 pages.

Oliveira, et al., "Fast Digital Image Inpainting", In: International Conf. on Visualization, Image and Image Proc., Sep. 2001, 6 pages.

Raimbault, et al., "Stereo Video Inpainting", Proceedings of SPIE: Stereoscopic Displays & Applications XXII. vol. 7863., 2011, 13 pages.

Scharstein, et al., "A Taxonomy and Evaluation of Dense Two-Frame Stereo Correspondence Algorithms", International Journal of Computer Vision, 47(1/2/3), 2002, pp. 7-42.

Simakov, et al., "Summarizing Visual Data Using Bidirectional Similarity", In Proceedings of CVPR 2008, Jun. 23, 2008, 8 pages.

Sun, et al., "Symmetric Stereo Matching for Occlusion Handling", In: IEEE Computer Society Conference on Computer Vision and Pattern Recognition (CVPR), 2005, 8 pages.

Wang, et al., "Stereoscopic Inpainting: Joint Color and Depth Completion from Stereo Images", In: IEEE Computer Society Conference on Computer Vision and Pattern Recognition (CVPR). 2008, 8 pages.

Wexler, et al., "Space-Time Completion of Video", IEEE Transactions on Pattern Analysis and Machine Intelligence, vol. 29, No. 3, Mar. 2007, 14 pages.

"Combined Search and Examination Report", GB Application No. 1417657.2, Mar. 23, 2015, 7 pages.

"Pre-Interview Communication", U.S. Appl. No. 13/866,632, Jul. 29, 2015, 10 pages.

"Pre-Interview Communication", U.S. Appl. No. 14/050,163, May 14, 2015, 3 pages.

Barnes,"PatchMatch: A Randomized Correspondence Algorithm for Structural Image Editing", ACM SIGGRAPH 2009 Papers (New Orleans, Louisiana, Aug. 3-7, 2009), Aug. 3, 2009, 10 pages.

Barnes,"The Generalized PatchMatch Correspondence Algorithm", retrieved from <http://www.cs.princeton.edu/gfx/pubs/Barnes_2010_TGP/index.php> on Sep. 9, 2010, 14 pages.

Fehn,"Depth-Image-Based Rendering (DIBR), Compression and Transmission for a New Approach on 3D-TV", Proceedings of the SPIE-IS&T Electronic Imaging, SPIE vol. 5291, 2004, pp. 93-104.

Morse,"PatchMatch-Based Content Completion of Stereo Image Pairs", 2012 Second International Conference on 3D Imaging, Modeling, Processing, Visualization and Transmission (3DIMPVT), Oct. 13-15, 2012, Oct. 13, 2012, 8 pages.

Ogale,"Occlusions in motion processing", SpatioTemporal Image Processing, Mar. 2004, London, UK., Mar. 2004, 3 pages.

"Final Office Action", U.S. Appl. No. 13/866,632, Sep. 28, 2015, 7 pages.

"Final Office Action", U.S. Appl. No. 14/050,163, Oct. 19, 2015, 20 pages.

"Foreign Office Action", GB Application No. 1417657.2, Oct. 9, 2015, 7 pages.

"Non-Final Office Action", U.S. Appl. No. 14/050,163, Apr. 5, 2016, 23 pages.

"Advisory Action", U.S. Appl. No. 14/050,163, Feb. 17, 2016, 6 pages.

"Notice of Allowance", U.S. Appl. No. 13/866,632, Jan. 20, 2016, 8 pages.

* cited by examiner

900

1100

Original Images

Masks Used for Completion

PatchMatch-Based Single-Image Completion

PatchMatch-Based Stereo Completion

Original Images

Masks Used for Completion

Stereo Completion

Stereo Completion (Anaglyph)

Original Images

Masks Used for Completion

Stereo Completion

Stereo Completion (Anaglyph)

Original Images

Masks Used for Completion

Stereo Completion

Stereo Completion (Anaglyph)

TARGET REGION FILLING INVOLVING SOURCE REGIONS, DEPTH INFORMATION, OR OCCLUSIONS

GOVERNMENT FUNDING

This invention was made with government support under Prime Award No.: 1019343 Subaward No.: CIF-B-149, CFDA: 47.070 awarded by The National Science Foundation. The government has certain rights in the invention. This material is based upon work supported by the National Science Foundation under Grant No. 1019343 to the Computing Research Association for the CIFellows Project.

BACKGROUND

Image editing techniques are becoming increasingly popular as the pervasiveness of image capture devices continues to increase. A user, for instance, may carry a mobile phone having a digital camera, a tablet computer, dedicated camera, and so on to capture an image of an image scene. A user may then employ image editing techniques to modify the image as desired.

One such example of an editing technique is commonly referred to as "hole filling." Hole filling may be used to support removal of objects from an image, such as to remove a person from the image, repair an image, and so on. To perform this technique, a hole created by removing the object is filled, which is typically based on areas of the image that lie "outside" the hole.

However, conventional hole filling techniques could generate inaccuracies in the image, which could be noticeable to a user. Further, these inaccuracies may be magnified in some instances, such as when used in stereoscopic images such that images modified using these conventional techniques could cause the stereoscopic images to fail for their intended purpose.

SUMMARY

Target region filling techniques are described. Techniques are described in which stereo consistency is promoted between target regions, such as by sharing information during computation. Techniques are also described in which target regions of respective disparity maps are completed to promote consistency between the disparity maps. This estimated disparity may then be used as a guide to completion of a missing texture in the target region. Techniques are further described in which cross-image searching and matching is employed by leveraging a plurality of images. This may include giving preference to matches with cross-image consistency to promote consistency, thereby enforcing stereo consistency between stereo images when applicable.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
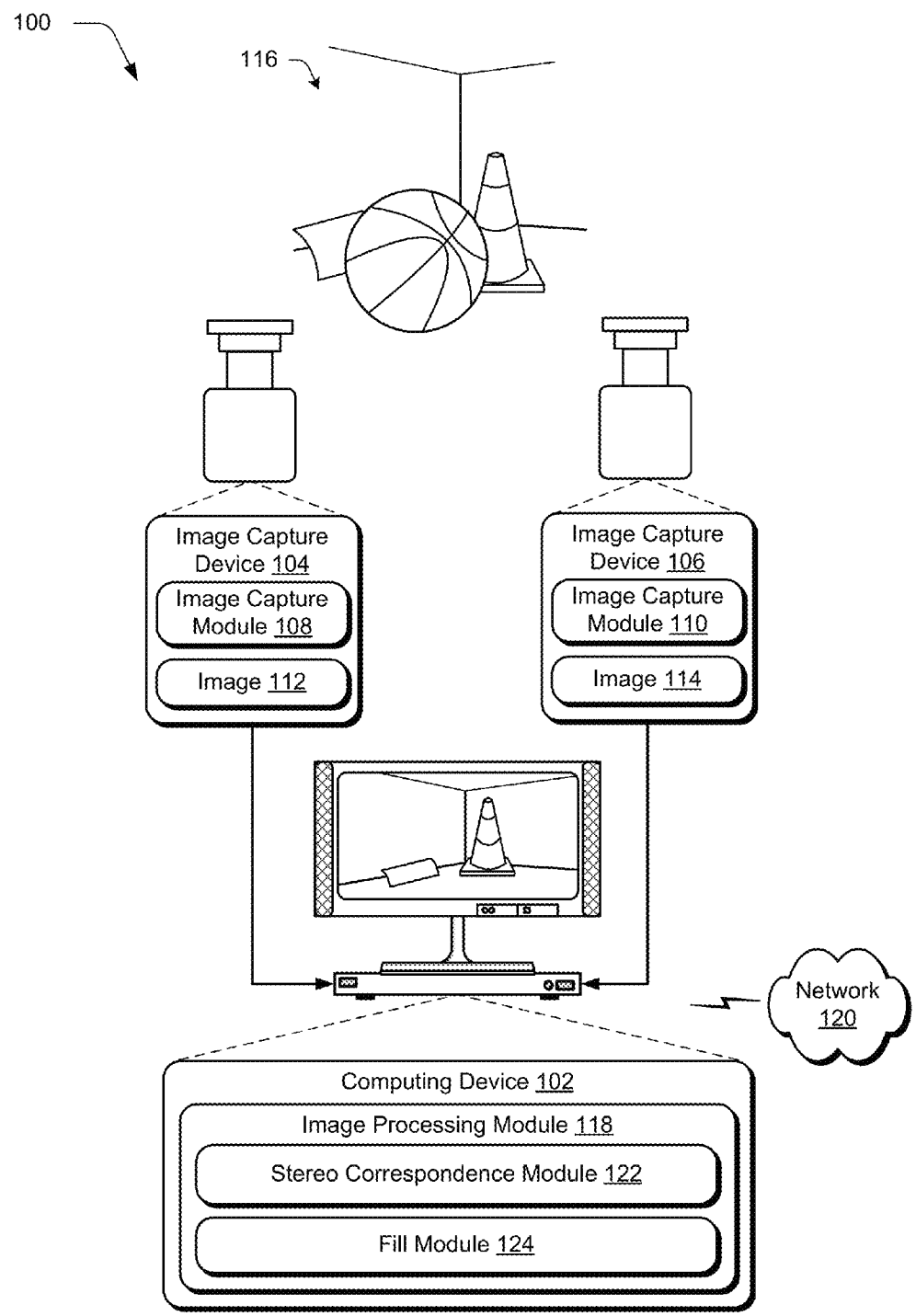
FIG. 1 is an illustration of an environment in an example implementation that is operable to employ techniques described herein involving target region filling.

As consumer-grade stereo cameras become increasingly common, users desire an ability to edit stereo images in ways that are conventionally employed for individual images. Consequently, this may introduce challenges of maintaining stereoscopic fidelity between the edited images. However, this may also introduce a new set of opportunities to take advantage of additional information that may be obtained from a pair of images.

An example of one technique that may be used to edit images involves replacement of target regions of an image with content by intelligently drawing from the rest of the image surrounding the target region, which is commonly referred to as hole filling. A variety of different techniques were conventionally employed to perform this replacement on single images. However, these conventional techniques may cause inconsistencies when applied to stereo images, thereby causing the stereo images to fail for their intended purpose, e.g., to support stereoscopic vision.

Accordingly, techniques are described herein that may be employed for target region filling that may be employed for stereo images as well as for images individually. In an implementation, techniques are described which involve completion of target regions that define missing portions of respective disparity maps to promote consistency between the disparity maps. This estimated disparity may then be used as a guide to completion of a missing texture in the target region. Further, coherence of the respective images may be encouraged such that the stereo images function as intended, e.g., support a stereoscopic view.

Techniques are also described in which cross-image searching and matching is employed by leveraging a plurality of images. For example, cross-image matching may be performed to automatically copy corresponding un-occluded portion of one image into another image. Further, when blending patches, preference may be given to matches with cross-image consistency, thereby enforcing stereo consistency between stereo images when applicable. A variety of other techniques are also contemplated, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Although the following discussion at times describes stereoscopic implementations, these techniques may also be applicable to single images as well as a plurality of images that are not stereoscopic. This may include multiple images of the same image scene (e.g., a particular landmark), multiple images having a matching object in different image scenes (e.g., a car photographed at different locations), and so forth.

Example Environment

FIG. 1 is an illustration of an environment 100 in an example implementation that is operable to employ techniques described herein. The illustrated environment 100 includes a computing device 102 and a plurality of image capture devices 104, 106, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 9.

The image capture devices 104, 106 may also be configured in a variety of ways. Illustrated examples of such configurations include a standalone camera such as a dedicated device, part of a mobile phone or tablet, and so on. Other examples are also contemplated. For example, each of the image capture devices 104, 106 may be configured as a single stereoscopic camera, scanner, copier, camera, mobile device (e.g., smart phone), and so forth. In another example, a single image capture device 104 may be used to capture multiple images of an image scene, such as the basketball, cone, and piece of paper in the room as illustrated.

The image capture devices 104, 106 are illustrated as including a respective image capture module 108, 110. The image capture modules 108, 110 are representative of functionality to capture respective images 112, 114, such as by including image sensors and other hardware and software components to capture, process, and/or store images 112, 114.

The images 112, 114 in this example are stereoscopic in that the images are taken from different viewpoints of the illustrated image scene 116. For example, the images 112, 114 may be viewable by a user to gain a perception of three dimensional depth of the image scene. The images 112, 114 may also be usable to model the image scene in three dimensions, such as to determine depth at various locations. This may be performed in a variety of ways as further described below.

Figure 10:
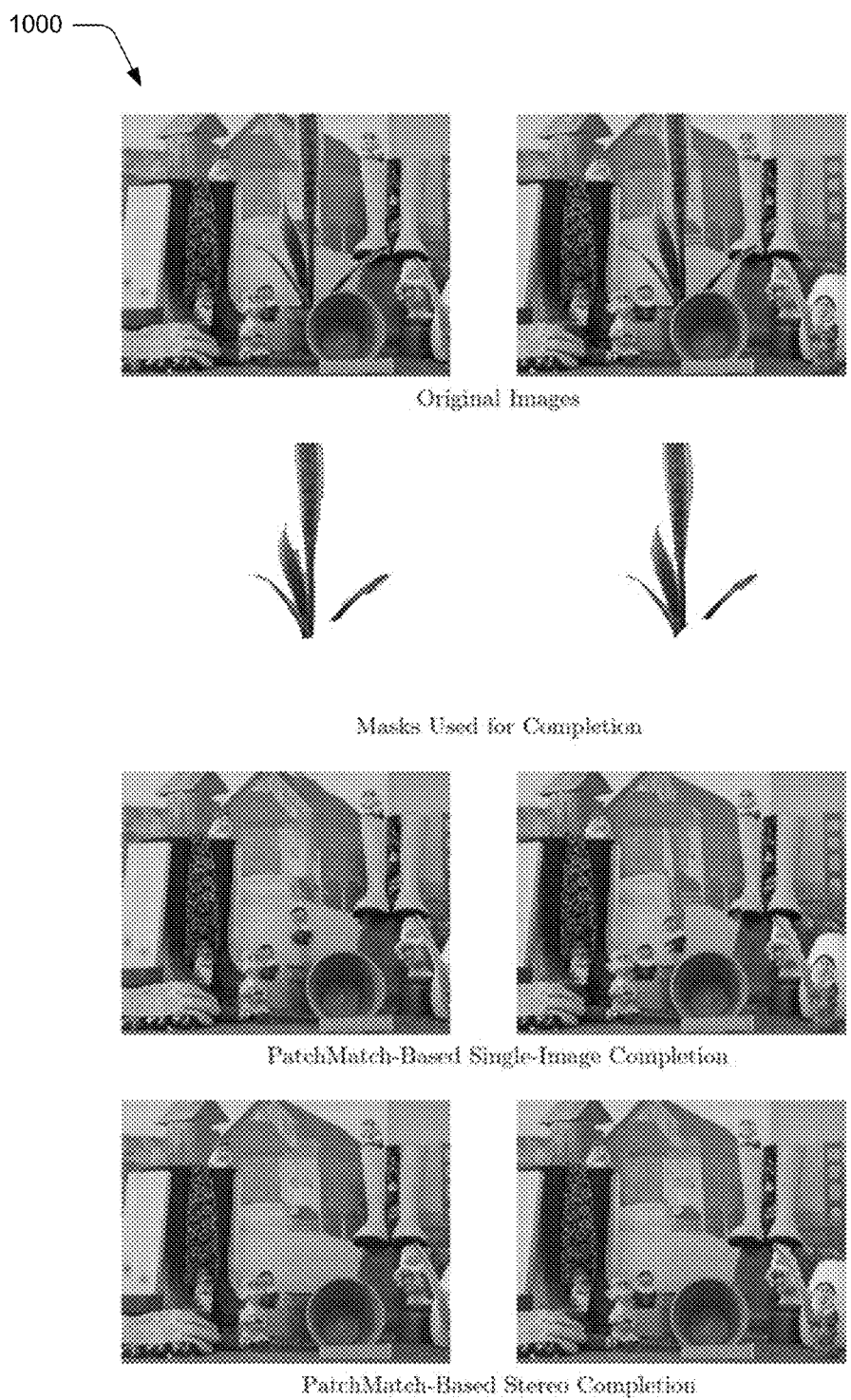
FIGS. 10-14 are illustrations of techniques in which a target region is filled after removal of an object from stereo images in which a disparity map is also filled.
Figure 11:
Figure 11:
Figure 11:
Figure 11:
Figure 11:
Figure 12:
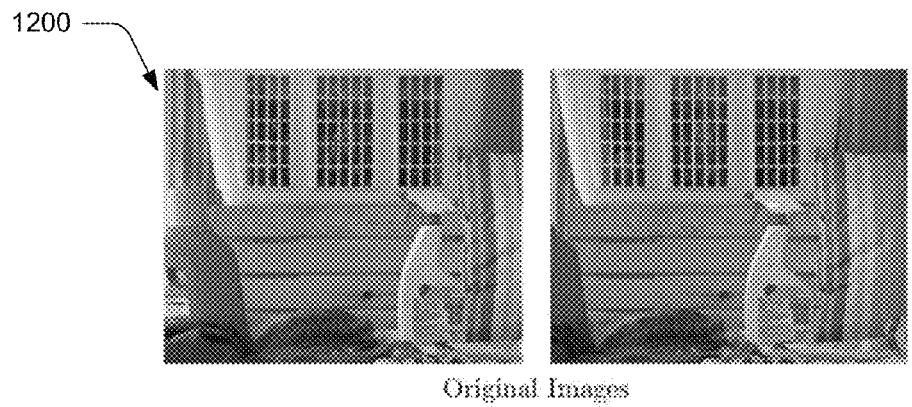
Figure 12:
Figure 12:
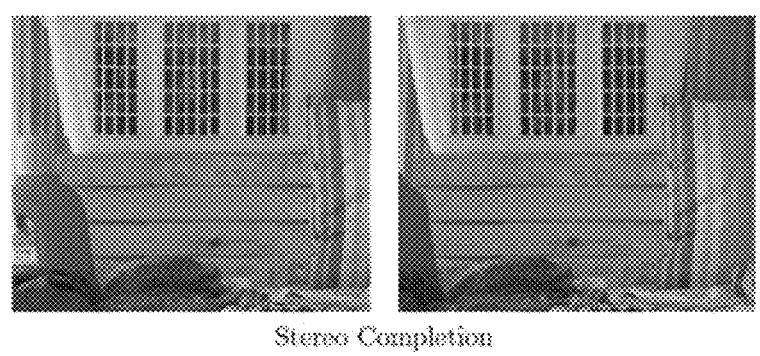
Figure 12:
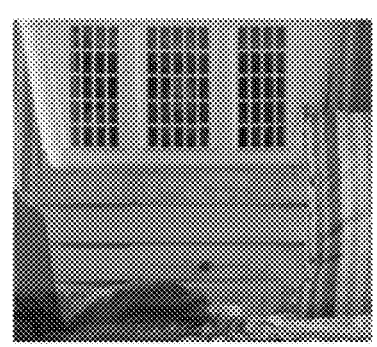
Figure 13:
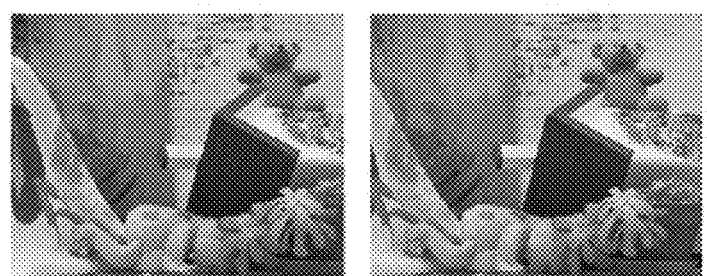
Figure 13:
Figure 13:
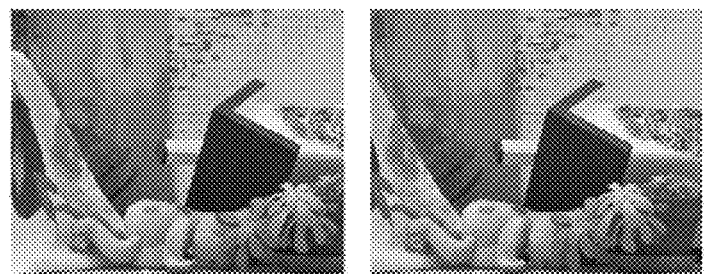
Figure 13:
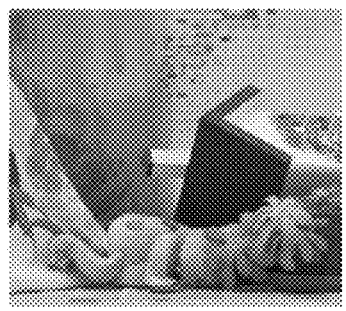
Figure 14:
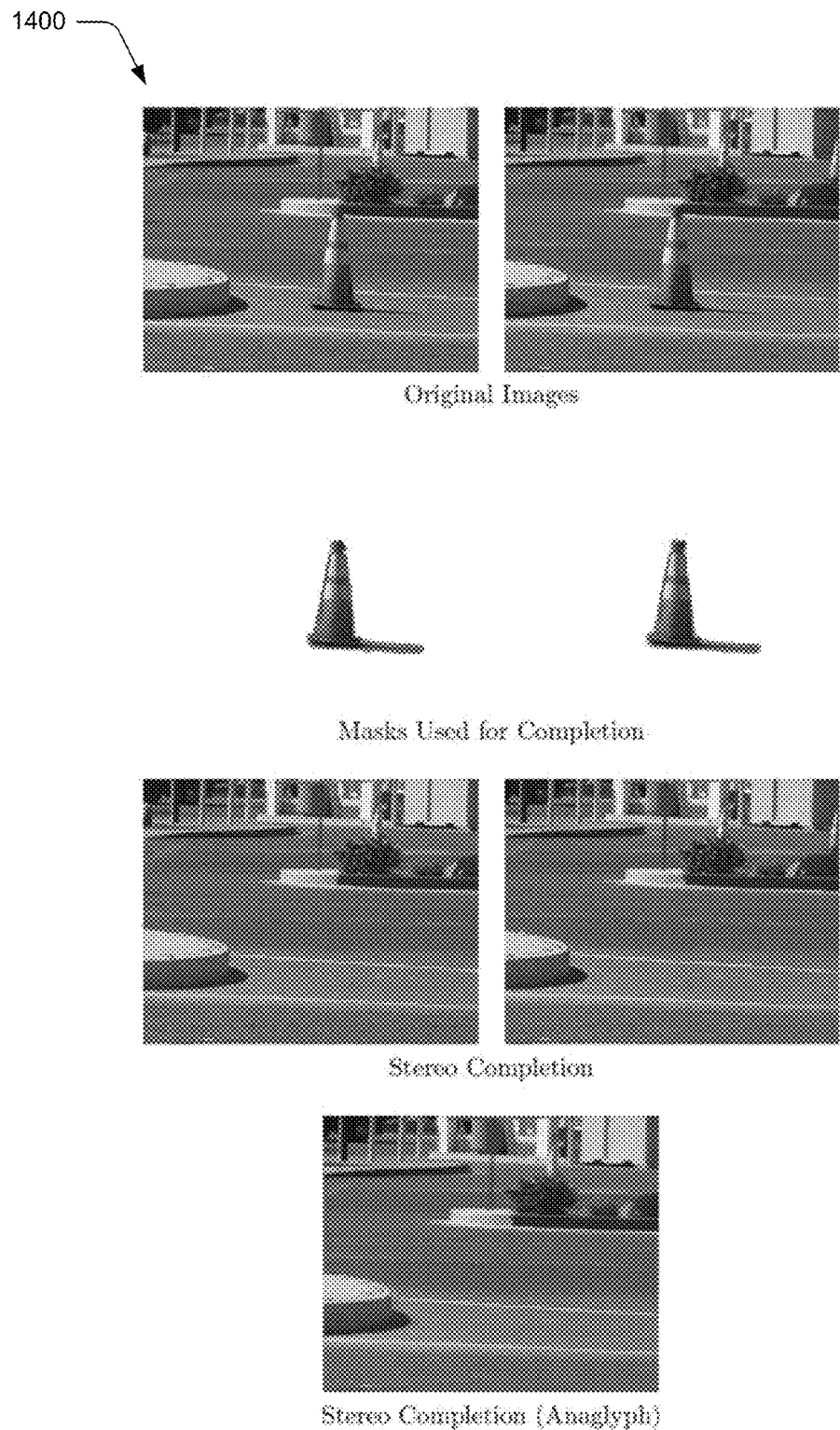

The computing device 102 is illustrated as including an image processing module 118. The image processing module 118 is representative of functionality to perform one or more techniques that are usable to process an image. Although illustrated as implemented locally on the computing device, functionality of the image processing module may also be implemented in a distributed environment, remotely via a network 120 (e.g., "over the cloud") as further described in relation to FIG. 10, and so on.

An example of image processing that may be performed by the image processing module 118 is represented as a stereo correspondence module 122. The stereo correspondence module 122 is representative of functionality to generate stereo correspondence data, which may describe which pixels in stereoscopic images correspond to each other and which may be expressed as a disparity. The stereo correspondence module 112, for instance, may process images 112, 114 to determine depth of the image scene 116 to perform three dimensional modeling, perform view synthesis, view interpolation, content manipulation, matting (e.g., object removal), support augmented reality (e.g., object insertion), and so on. Other examples are also contemplated, such as to capture images 112, 114 that are not stereoscopic, but still provide different views of the image scene 116.

Another example of image processing that may be performed by the image processing module 118 is represented as a fill module 124. The fill module 124 is representative of functionality to fill a target region in one or more of the images 112, 114. For example, the fill module 124 may be used to support object removal from one or more of the images 112, 114, such as to remove the basketball from the images 112,114 as shown in the user interface output by the display device of the computing device 102 in the figure. Other examples 1000-1500 are also shown in relation to FIGS. 10-15. These techniques may also be used for a variety of other purposes, such as to fill a portion in an image that is missing, e.g., due to occlusion, errors, and so on. This processing may be performed in a variety of ways, further description of which may be found in the following discussion and corresponding figure.

Figure 2:
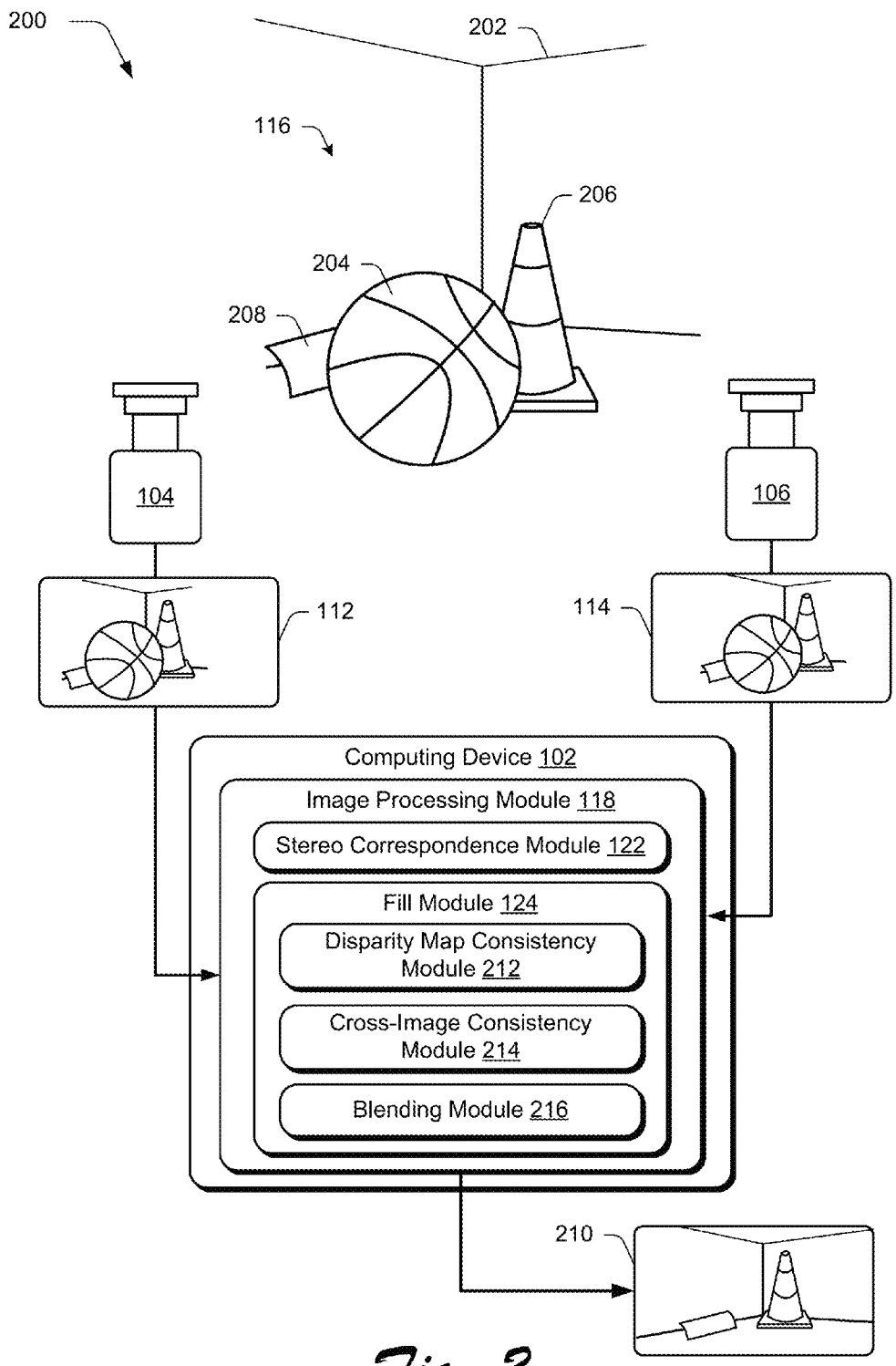
FIG. 2 depicts a system in an example implementation in which images are captured of an image scene and used to fill a target region.

FIG. 2 depicts a system 200 in an example implementation in which images 112, 114 are captured of an image scene 116 and used to fill a target region. The image scene 116 is illustrated as showing a room 202 having a basketball 204, a traffic cone 206, and a piece of paper 208. The image capture devices 104, 106 are illustrated as capturing images 112, 114 of the image scene 116, which may be stereoscopic or non-stereoscopic as further described below. In a stereoscopic implementation, the images may be leveraged for a variety of purposes, such as for three dimensional modeling, view interpolation, and so on.

To support this example, the image processing module 118 may employ the stereo correspondence module 122 to compute stereo correspondence data that describes which pixels in the images 112, 114 correspond to each other, such as to include disparity maps and textures to be employed by the respective images 112, 114. This data may be leveraged to support a wide variety of functionality.

The fill module 124, for instance, may leverage this functionality to "fill in" a target region of an image. One or more of the images 112, 114 for instance, may be processed by the fill module 124 to remove an object from the image, such as to remove the basketball 204 to generate the image 210 as shown in the figure.

While stereoscopic consistency may be a challenge, especially in target region filling, the availability of additional depth information from stereo pairs or other related images (e.g., different images of the image scene 116 that are not configured to support a stereoscopic view) may be used to increase accuracy in performing this operation.

The available depth information, for instance, may be used to provide an additional dimension of information for creating a patch (e.g., a completion) that is consistent with expectations of a human eye. Depth information may be obtained in a variety of other ways, such by using a depth sensor that is configured to output data that describes depth of the image scene 116 at different locations, through computation of stereo correspondence, and so on.

Regardless of how originated, the depth information may be leveraged in a variety of different ways. For example, a technique may be employed to pre-fill disparity maps in a way that maintains mutual consistency as shown in the example 900 of FIG. 9, thus allowing the respective disparity estimates to aid further matching and blending. This may be performed by sharing information involved in the computations, such that a computation to arrive at a first patch for a first image may leverage information used in the computation of a second patch for a second image. This functionality is represented as disparity map consistency module 212 in the figure.

In another example, techniques may be supported that provide for cross-image search and depth-sensitive comparison to both a target region and a stereo-corresponding target region in another image. This may also be performed by sharing information involved in the computations such that information involved in the computations may involve different patches for different images. This functionality is represented as a cross-image consistency module 214 in the figure.

In a further example, techniques are described that involve an extension to a weighted blending of matched target region patches that give preference to strong stereo correspondence at desired disparities. This functionality is represented as a blending module 216 in the figure. Further, computation involved in the filling of the target regions in the disparity maps and the filling of the respective stereoscopic images using the color texture may be performed such that information involved in the computations is shared, e.g., information is propagated between the calculations for the respective regions.

Thus, a system may be supported that may be used to promote coherence of respective target regions with respect to the rest of the source images 112, 114 while also maintaining stereoscopic consistency. This may be performed to match patches in a way that allows for cross-image copying in the case of regions that are originally partially-occluded without involving an explicit pre-copying step. This allows loosely marked masks that are independent such that the masks include non-corresponding pixels to be handled gracefully without requiring correspondence in the two images.

Figure 15:
FIG. 15 is an example of a graffiti removal target filling technique in which depth information is retained.
Figure 15:
Figure 15:
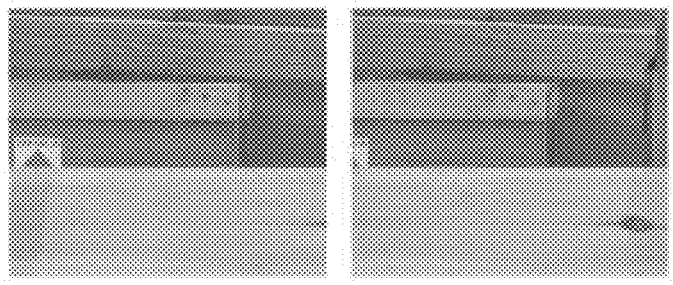
Figure 15:
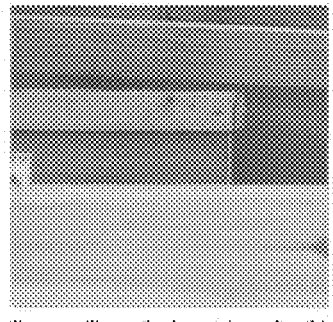

This technique may also handle removal and replacement of texture on a three dimensional object (e.g., a wall of the room 202 or other surface as shown in the example 1500 of graffiti removal in FIG. 15), removal of an entire object such as the basketball 204 in FIG. 2 as well as the examples 1100-1400 of FIGS. 11-14, and so on. Thus, the use of depth information may support techniques to fill a target region with accuracy that is increased with respective to conventional single-image completion techniques. Although the following discussion uses stereo images in a variety of different examples, it should be readily apparent that these techniques may also leverage images that are not stereoscopic, such as different views of an image scene that would not support a stereoscopic view when viewed by a user, may involve an object located in different image scenes, and may also be performed to generate a single image.

In one or more implementations, techniques are described that may leverage a single image patch-matching based completion approach. For example, the following measure of image coherence may be minimized:

$$d_{total}(S, T) = \sum_{t \in T} \min_{s \in S} d(s, t)$$

where "T" is a target region, "S" is a source region (e.g., an area of the image outside of the target region), and "t∈T" and "s∈S" are patches within target and source regions, respectively. The expression "$d(s,t)=\|s-t\|_2^2$" is a measure of a difference between patches "s" and "t". Intuitively, this is used to ensure that each patch within a filled region is similar to a corresponding patch in the rest of the image such that artifacts introduced that would not match patches in the rest of the image are penalized.

Thus, this expression is satisfied when two conditions are met at each point "p." In the first condition, each of the patches "t∈T" that overlap point "p" have an exact match "s∈S", and hence "d(s,t)=0." In the second condition, each of the patches "t∈T" overlapping "p" agree on a value at "p" such that the blended results of the patches do not introduce additional error. Thus, an energy/magnitude style approach may be taken by iteratively alternating between matching each target patch "t∈T" to its best match "s∈S", blending of the resulting patches is used to synthesize the content in the target region to fill the region.

Figure 3:
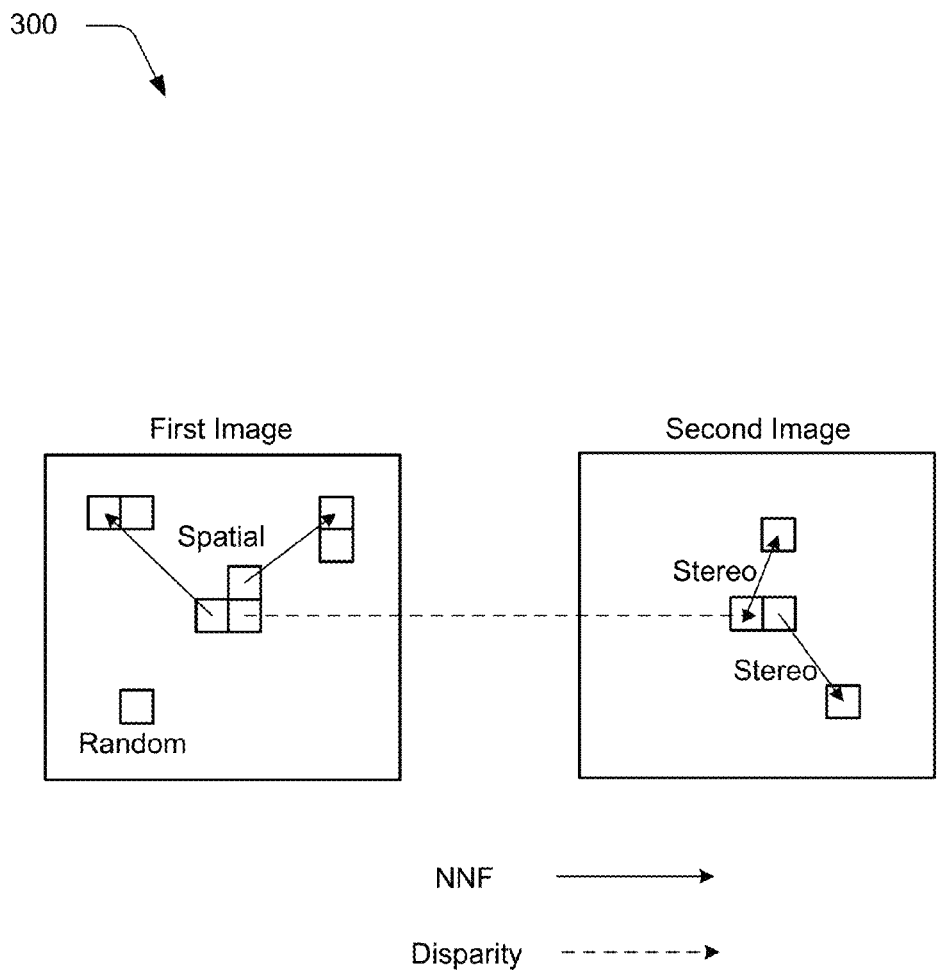
FIG. 3 depicts an example of operation of a patch-matching algorithm.

The patch-matching based approach may avoid exhaustive search by leveraging spatial propagation of matches and random search to support efficient techniques for finding good matches shown in the example 300 of FIG. 3. For example, a "nearest neighbor field" (NNF) technique may be employed, which may provide a mapping from each patch in an image to a corresponding best (so far) match outside the target region, which may be denoted as "s=NNF(t)."

Additionally, techniques may be employed to update "best matches" and then blend the matches into the target region. This may be performed by weighting each blended patch by a monotonically decreasing function of the distance from the patch to the boundary of the target region. This may help drive content into the target region from the outside of the region. Additionally, a gradual-resizing approach may be used to create a multi-scale pyramid. At a coarsest scale of the pyramid, diffusion filing may be used to initialize a patch-matching based energy/magnitude iteration. For subsequent scales, the NNF from a previous scale may be up sampled, examples of which are further described in relation to the following sections.

Stereo Image Completion

A stereo pair of images 112, 114 may be configured in a variety of ways. For purposes of the following discussion, these images 112, 114 are treated as four-valued "RGBD" images in which "D" is a disparity. Additionally, the images 112, 114 may have been rectified by the image processing module 118 and stereo correspondence computed by the stereo correspondence module 112. A user may then provide a mask specifying one or more target regions as shown in the examples 1000-1500 of FIGS. 10-15. This may be performed in a variety of ways, such as by manual selection through interaction with a stereo-based selection tool, use of a cursor control device, gesture, through automatic selection by a module (e.g., of a foreground object), and so forth.

Figure 9:
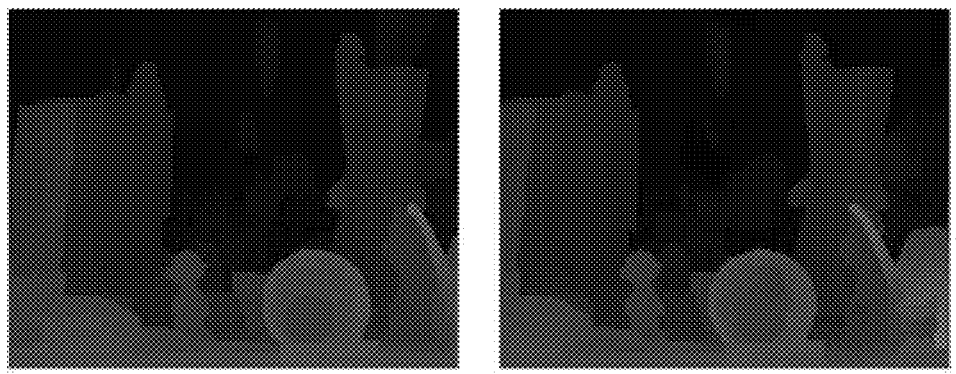
FIG. 9 illustrates an example of disparity maps.

Disparity maps as shown in the example 900 of FIG. 9 may have characteristics that are quite different than those of respective color images. Unlike color images with rich texture, for instance, disparity maps generally involve smooth regions with strong spatial structure, qualities that may be exploited in algorithms for computing stereo disparity, e.g., by the stereo correspondence module 122. In one or more implementations, the target regions of the disparity maps are filled first. The disparity maps may then be used to guide selection of source patches to complete a target region's color texture.

Target region filling may be leveraged for a variety of purposes. For example, filling may be used to remove entire foreground objects as previously described in the example of the basketball. Other examples include removal of three-dimensional structural detail on a larger object, such as a wall and so on in an image as shown in the examples 1000-1400 of FIGS. 1000-1400. In another example, physical structure of the image scene 116 may be retained, but a target region may be used to replace texture on an object, which may be referred to as "graffiti removal" as shown in the example 1500 in FIG. 15 and which may also be used to adjust and remove shadows and so on. Thus, implementations are contemplated in which a user may specify whether to fill disparities in a target region or to retain and use the original disparity maps. A stereoscopically consistent texture may then be synthesized based on these disparities are further described below.

Depth Completion

In this example, two disparity maps "$D_L$" and "$D_R$" are described which refer to left and right images, respectively. These two disparity maps may be used to handle depth information in half-occluded regions as described below. Prior to use, holes in the disparity maps may be filled by the stereo correspondence module 122 using a "smaller hole" variation of the techniques described in this section.

In one or more implementations, partial differential equation (PDE) based in-painting techniques may be used to recover a smooth spatial structure in the disparity maps. For example, in-painting of a single disparity map "D" may involve the following iteratively solved PDE:

$$\frac{\partial}{\partial t} D = \nabla L \cdot \nabla_\perp D$$

where $L=\nabla^2 D$ denotes the described 2D Laplacian of the disparity map. Intuitively, this PDE is used to propagate image curvature along image level curves, thus filling regions and preserving edge structure. To reduce the number of iterations involved for numerical implementation of the above expression, the target region may be initialized using a diffusion-based fill. The diffusion into the target region may be limited to disparities smaller (i.e., more distant) than the original content in the region.

As previously described, conventional techniques that were employed for images singly could cause artifacts that were viewable between stereoscopic images. Accordingly, techniques are described in which target filling is used in which stereoscopic consistency is enforced. For example, a weak consistency constraint may be used as part of the expression of the iteratively solved PDE above.

Values in disparity maps, e.g., "$D_L$" and "$D_R$", may be characterized on a point-by-point basis in the images as follows:

Consistent and viewable in both images:

$$D_L(x,y)=D_R(x-D_L(x,y),y)$$

$$D_R(x,y)=D_L(x+D_R(x,y),y)$$

Half-occluded such that an object is viewable in one image but occluded in another:

$$D_L(x,y)<D_R(x-D_L(x,y),y) \text{ or}$$

$$D_R(x,y)<D_L(x+D_R(x,y),y)$$

Physical inconsistency, e.g., physically impossible to be occluded from behind:

$$D_L(x,y)>D_R(x-D_L(x,y),y) \text{ or}$$

$$D_R(x,y)>D_L(x+D_R(x,y),y)$$

Thus, the expression of the iteratively solved PDE above may be modified to create a pair of coupled PDEs that include in-painting of respective disparity maps as well as additional terms that promote mutual consistency and therefore stereoscopic consistency as follows:

$$\frac{\partial}{\partial t} D_L = \nabla L_L \cdot \nabla_\perp D_L + \lambda \rho_L$$

$$\frac{\partial}{\partial t} D_R = \nabla L_R \cdot \nabla_\perp D_R + \lambda \rho_R$$

where "$L_L$" is a Laplacian of "$D_L$", and "$L_R$" is a Laplacian of "$D_R$", and $$\rho_L(x, y) =$$
$$\begin{cases} D_R(x - D_L(x, y), y) - D_L(x, y) & \text{if } D_R(x - D_L(x, y), y) - D_L(x, y) < \epsilon \\ 0 & \text{otherwise} \end{cases}$$

$$\rho_R(x, y) =$$
$$\begin{cases} D_L(x + D_R(x, y), y) - D_R(x, y) & \text{if } D_L(x - D_R(x, y), y) + D_R(x, y) < \epsilon \\ 0 & \text{otherwise} \end{cases}$$

are the consistency terms, with "$\epsilon$" controlling the tolerance. If the above expression describing consistency for the values in the disparity maps applies at a given pixel to within "$\epsilon$" tolerance (e.g., less than or equal to a tolerance of "1" or other value), an assumption may be made that the disparities are to be consistent. Therefore, these disparities may be adjusted to increase similarity as desired.

On the other hand, if the half-occluded characterization above applies at a given pixel greater than "$\epsilon$" tolerance, an assumption may be made that the pixels are involved in a "half occlusion" and therefore the differing disparities are retained. Further, if the inconsistency characterization above applies, the disparity maps may be adjusted to correct this physical inconsistency.

Texture Matching and Synthesis

To synthesize texture over the respective disparity maps of the images 112, 114 to perform the "completion" shown in FIGS. 10-15, the objective function described above may be broadened to allow for the drawing of source textures from either image, penalize stereo mismatches between the images, and so on. For example, let "$S_L$," and "$S_R$" denote source regions in left and right images, respectively, and similarly let "$T_L$" and "$T_R$" denote respective target regions. Also, let "$C_{LR}(t)$" denote mapping from patch "$t_L \epsilon T_L$" centered at "(x, y)" to a corresponding patch "$t_R \epsilon T_R$" centered at "$(x-D_L(x, y), y)$." To simplify further notation in the following discussion, "$C(t)=C_{LR}(t)$" is used for patches in the left image and "$C(t)=C_{RL}(t)$" is used for patches in the right image, respectively.

Optimization of stereo-filling coherence may therefore be defined as a minimization of the following objective function:

$$d_{total}(S_L, S_R, T_L, T_R) = \sum_{t \in T_L \cup T_R} \min_{s \in S_L \cup S_R} d(s, t) + \sum_{t \in T_L} d(t, C_{LR}(t)) + \sum_{t \in T_R} d(t, C_{RL}(t))$$

Here, the patch-difference measure "d(s,t)" may be redefined to be a mean squared difference between the RGBD values of the patches. Other patch distances and ways of incorporating depth and/or disparity are also contemplated.

The first term is similar to the above expression regarding the image coherence measure and encourages coherent filling of the target regions in the respective images. It should be noted that the matching of patches across the two images is explicitly allowed in this example, thereby providing a richer set of source patches.

The additional two terms in the expression above encourage stereo consistency by penalizing patches that exhibit visual dissimilarity at the relevant disparity. While this likewise does not immediately imply an algorithm for optimization, the energy/magnitude approach of the pair of coupled PDEs above that is designed to promote mutual consistency may be extended. This extension may be performed based two observations. First, that the objective function for stereo-filling coherence is minimized if both of the conditions identified above for minimizing the measure of image coherence are met. Second, the objective function for stereo-filling coherence is minimized if each of the pixels in the target regions are filled with content that exactly matches a corresponding patch in the other image at the relevant disparity. This may be true unless such content would not be visible in the other image, i.e., half occluded. To encourage this, the patch-blending step of the energy/magnitude process may be modified to give increased weight to patches that are stereo-consistent, unless occluded in the other image. The patch-matching search may also be expanded to include patches from both images, including a propagation step designed to facility stereo consistency.

Stereo Patch Matching

Because the two source images provide a larger set of source patches than either image alone, and because some useful patches may be visible in one image but not in the other, the patch-matching algorithm may be extended to include cross-image searching as previously described. The patch-matching algorithm may use two parts to search for better patches than currently found, an example 300 of which is shown in FIG. 3. The first is a propagation step, in which the neighbors of patches matched to those neighboring the current patch are considered as "spatial" examples. For example, the current NNF matches for the neighbors of "t" are considered to update "NNF(t)". The second involves a random search step shown as "random" in the figure.

As shown in the example implementation 300 of FIG. 3, this may be extended to include a stereo-correspondence step, in which the stereo-corresponding patch in the other image is considered, e.g., for patch "C(t)" which is illustrated as "stereo" in the figure. Thus, this may also include a stereo propagation step, in which matches found for the neighbors of the corresponding patch "C(t)" are considered. In one or more implementations, inclusion of the current values for the stereo-corresponding patch in the other image "C(t)" is the only time matching is allowed between a target patch to a patch that is inside or overlaps either target region.

This inclusion in the expanded search allows for copying (and subsequent blending) of patches that have been found in the other image, leading to minimization of the latter two terms of the stereo-filling coherence objective function above. It should be noted that the stereo-corresponding patch is still selected as the best-corresponding patch during the patch-matching process, which ultimately allows the image for which the best completion is found to dominate the other, weaker solution. It is also possible that during this stereo-correspondence part of the search the corresponding patch is part of the source region, and not the target region, for the other image. This may happen when removal of a foreground object dis-occludes a region in one image that is visible in the other image. Conventional techniques relied heavily by explicitly warping originally half-occluded data, however the techniques described herein may be performed without an explicit copying pre-step. Further, cross-image copying may happen automatically as part of the searching and synthesis process in these techniques.

In addition to the spatial propagation step of the patch matching algorithm referenced above, a stereo propagation step may also be included. The stereo propagation step may be used to expand the pool of candidate source patches further to include not only the corresponding patch "C(t)" in the other image, but the current best matches to "C(t)" according to the other image's NNF. Due to sub-pixel disparities, which are present in the multi-scale hierarchy even if the original disparity maps use only integer disparities, this means searching two possible candidates using the floor and ceiling of the x coordinates of "C(t)."

Stereo-Consistent Patch Blending

Once the nearest-neighbor field is updated using the extended patch-matching algorithm above, a "patch voting" operation may be performed to blend the source patches and fill the target region. In order to promote stereo consistency, increased blending weight may be given to those patches that are consistent with their stereoscopic counterparts in the other image. For example, the blending weight of pixels in patch "t" may be a function of the similarity between "t" and the stereo-corresponding patch "C(t)."

The color "c" of a particular target pixel "p," for instance, may be calculated using a weighted blending of the values of the source patches "s" matched to each target patch "t" that overlaps pixel "p," in a manner similar to the mutual consistency expression described above. For example, let "$\{t^1, t^2, \ldots, t^k\}$" denote a set of patches overlapping pixel "p," whether entirely inside the target region "T" or not. Also, let $\{s^1, s^2, \ldots, s^k\}$" denote respective best matches for the patches. If "$c^i$" is used to denote the color for pixel "p" as suggested by the source patch "$S^i$" and weight "$w^i$" denote the weight given to patch "$t^i$", the color "c" for pixel "p" is given by the weighted blending:

$$c = \frac{\sum_i w^i c^i}{\sum_i w^i}$$

The weights "$w^i$" are a combination of two factors. The first factor is the same as the one used for single-image filling as described for the conventional patch-matching algorithm above. The second factor is an additional factor that penalizes stereoscopic mismatches as follows:

$$w^i = w_d^i w_s^i$$

The distance-based weight "$w_d^i$" may be calculated by:

$$w_d^i = \gamma^{-dist(p^i, T)}$$

where "$dist(p^i, T)$" is a distance from "$p_i$" (the center of patch "$t^i$") to a boundary of a target region "T", or "0" if "$p_i$" lies outside of "T." In one or more implementations, a value of $\gamma = 1.3$ is used.

The stereoscopic-consistency weight "$w_s^i$" is given by comparing un-occluded parts of patch "$t^i$" to a (possibly sub-pixel) counterpart in the other image as follows:

$$w_s^i = e^{\frac{-\bar{d}_s(t^i, C(t^i))}{2\sigma_c^2}}$$

The occlusion-respecting patch squared difference "$\bar{d}_s(t^i, C(t^i))$" is calculated as the mean squared difference between the mutually un-occluded portions of the patches "$t^i$" and "$C(t^i)$", again which may support sub-pixel comparison. If the entire patch "$t^i$" is occluded from view in the other image (i.e., there is no corresponding "$C(t^i)$"), "$\bar{d}_s(t^i, C(t^i))$" is set to a maximum of "$3 \cdot 255^2$" to give a minimal but non-zero weight in the blending. This has the effect of causing half-occluded regions to be filled from the un-occluded side, thereby giving a stronger weight to the contributions from un-occluded neighboring patches. Within the half-occluded region, however, these patches each have the same (albeit low) weight, which effectively removes the effect of this weighting factor from the weights "$w^i$" above through normalization of the weighted blending. In one or more implementations, a value of "$\sigma_c = 7$" is used.

Example Procedures

The following discussion describes target region filling techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

Figure 4:
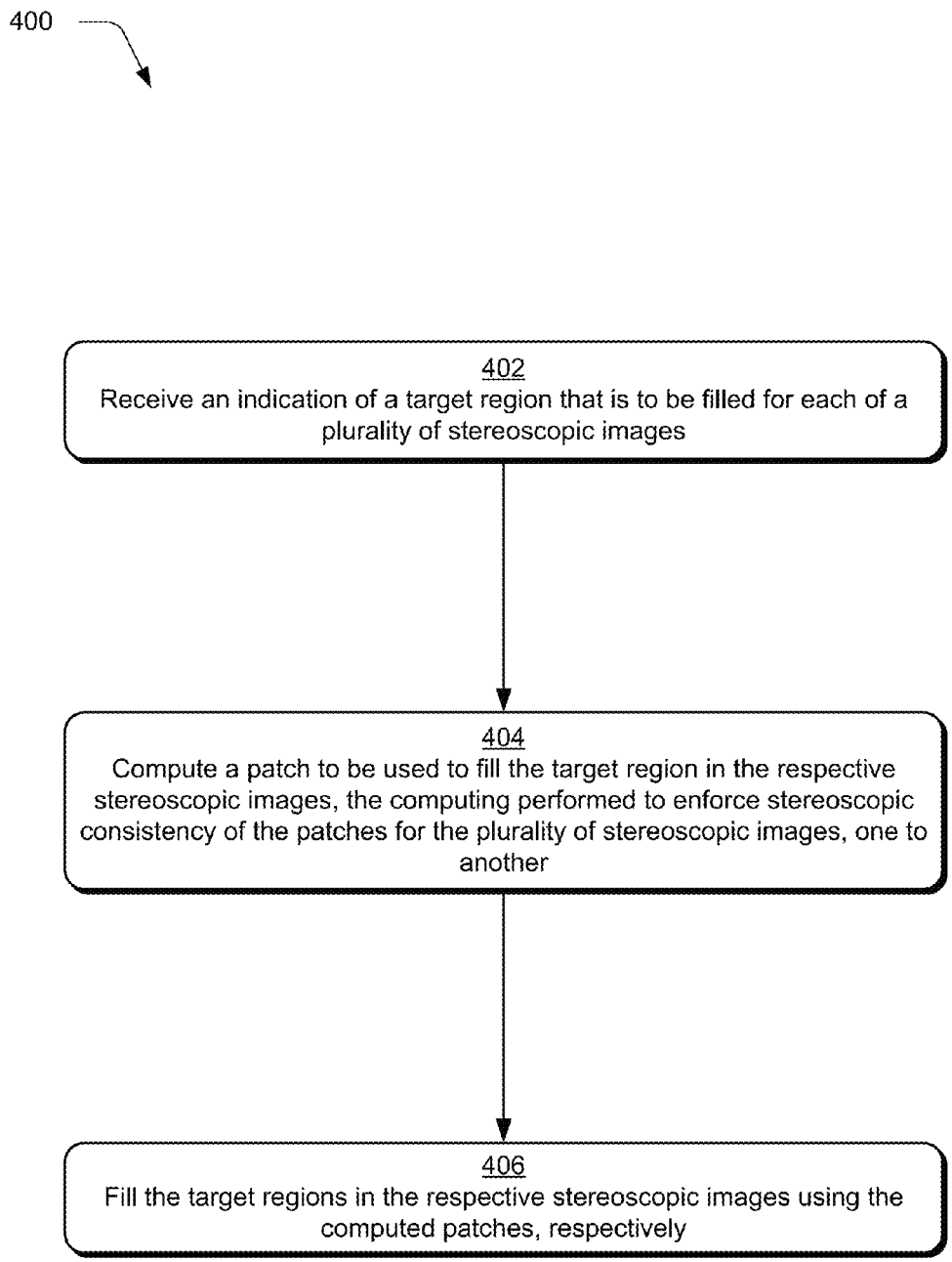
FIG. 4 is a flow diagram depicting a procedure in an example implementation in which stereoscopic consistency of patches is enforced to fill target regions for a plurality of stereoscopic images.

FIG. 4 depicts a procedure 400 in an example implementation in which stereoscopic consistency of patches is enforced to fill target regions for a plurality of stereoscopic images. An indication is received of a target region that is to be filled for each of a plurality of stereoscopic images (block 402). The indication may describe a boundary, pixels involved in a target region, and so on. This indication may originate in a variety of ways, such as through manual selection by a user, automatic selection by a module (e.g., to automatically specify an object for removal from an image), and so on.

A patch is computed to be used to fill the target region in the respective stereoscopic image, the computing performed to enforce stereoscopic consistency of the patches for the plurality of stereoscopic images, one to another (block 404). For example, the computation of the patches may be performed to employ weighting the promote consistency and penalize inconsistencies such that images are suitable for stereoscopic use as previously described. This may include use of depth information to guide creation of color textures for the patches. The target regions are then filled in the respective stereoscopic images using the computed patches, respective (block 406), such as to use synthesized color textures to complete the images.

Figure 5:
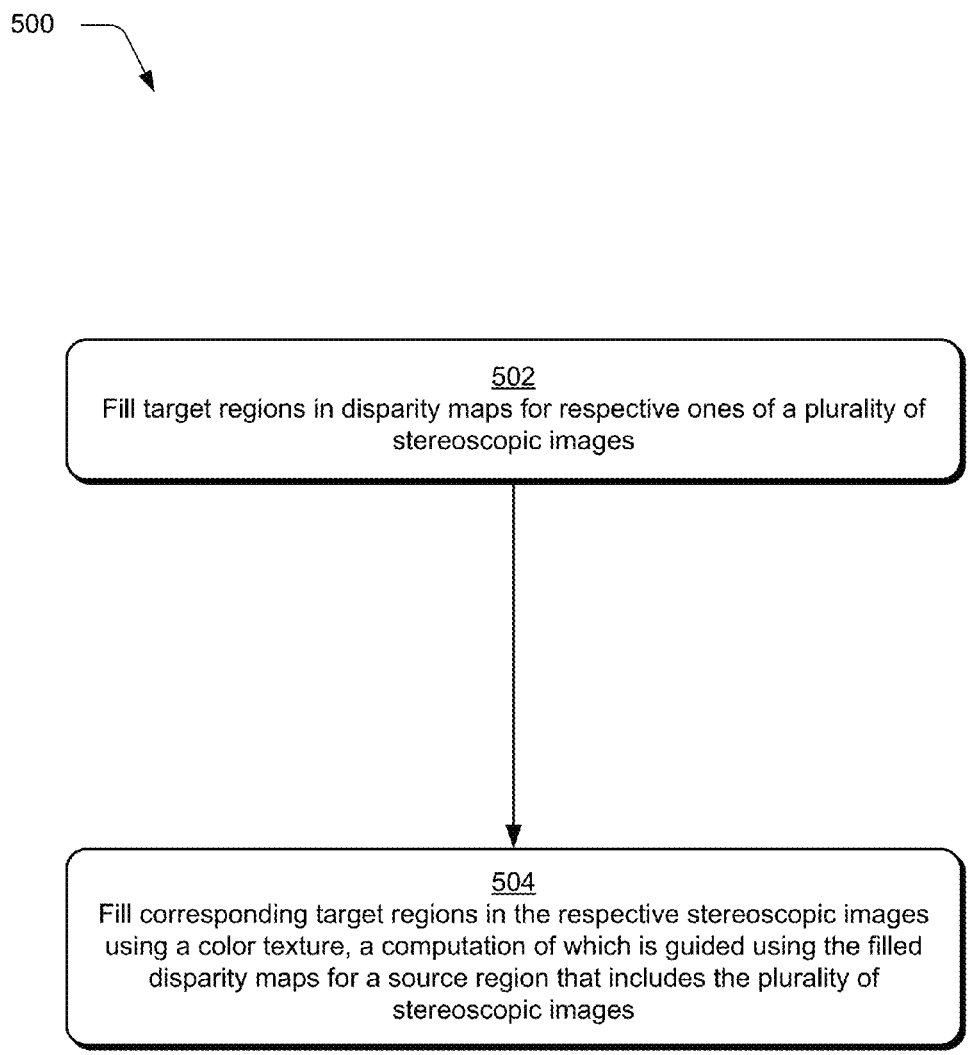
FIG. 5 is a flow diagram depicting a procedure in an example implementation in which a target region in a disparity map is filled and then target regions in stereoscopic images are filled using a color texture.

FIG. 5 depicts a procedure 500 in an example implementation in which a target region in a disparity map is filled and then target regions in stereoscopic images are filled using a color texture. Target regions in disparity maps for respective ones of a plurality of stereoscopic images are filled (block 502). The target regions, for instance, may be specified for removal. Accordingly, resulting "holes" in disparity maps are filled as previously described, such as to define geometries of an image scene captured by the images.

Corresponding target regions in the respective stereoscopic images are filled using a color texture, a computation of which is guided using the filled disparity maps for a source region that includes the plurality of stereoscopic images (block 504). The filled disparity maps, for example, may be used to guide which patches in the images likely correspond to the target region, such as based on location at a similar depth. Further, source regions may include both images such that a wider range of patches are available, which may be used to support filling of half-occluded regions and so on as previously described.

Figure 6:
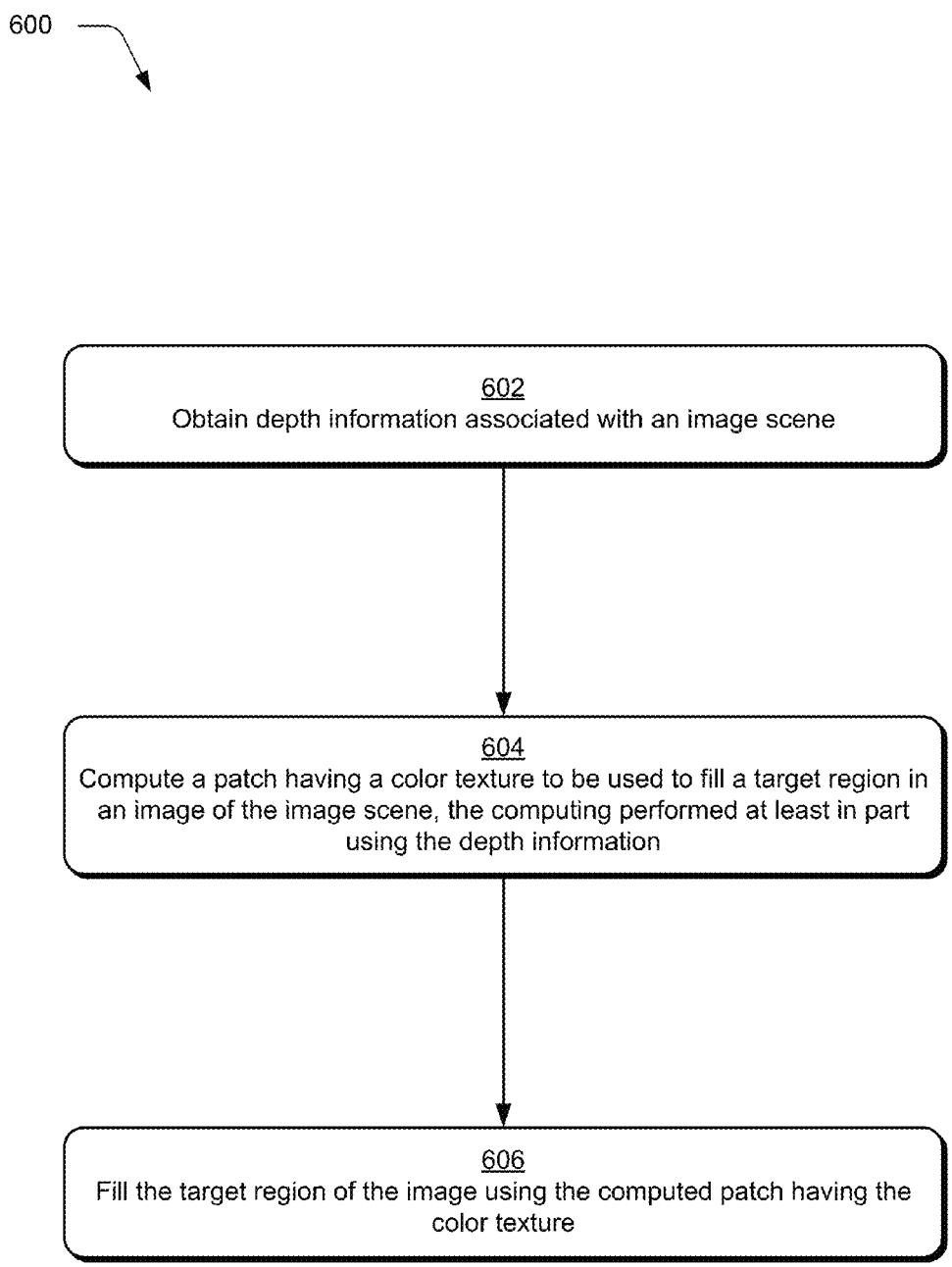
FIG. 6 is a flow diagram depicting a procedure in an example implementation in which depth information is used to compute a color texture patch.

FIG. 6 depicts a procedure 600 in an example implementation in which depth information is used to compute a color texture patch. Depth information is obtained that is associated with an image scene (block 602). The depth information may be obtained in a variety of ways, such as from a depth sensor (e.g., laser range finder, grid-projection system, time-of-flight camera, and so on), computed using a stereoscopic images, and so on.

A patch is computed having a color texture to be used to fill a target region in an image of the image scene, the computing performed at least in part using the depth information (block 604). The depth information, may be used to define geometries of an image scene, as well as which parts of the image are located at similar depths. Thus, this information may be used to guide selection of patches from source regions that lie outside of the target region.

The target region of the image is then filled using the computed patch having the color texture (block 606). This may be used to support a variety of functionality, such as graffiti removal (e.g., by keeping depth information for the target region), object removal (e.g., to compute new depth information for the target region), and so on.

Figure 7:
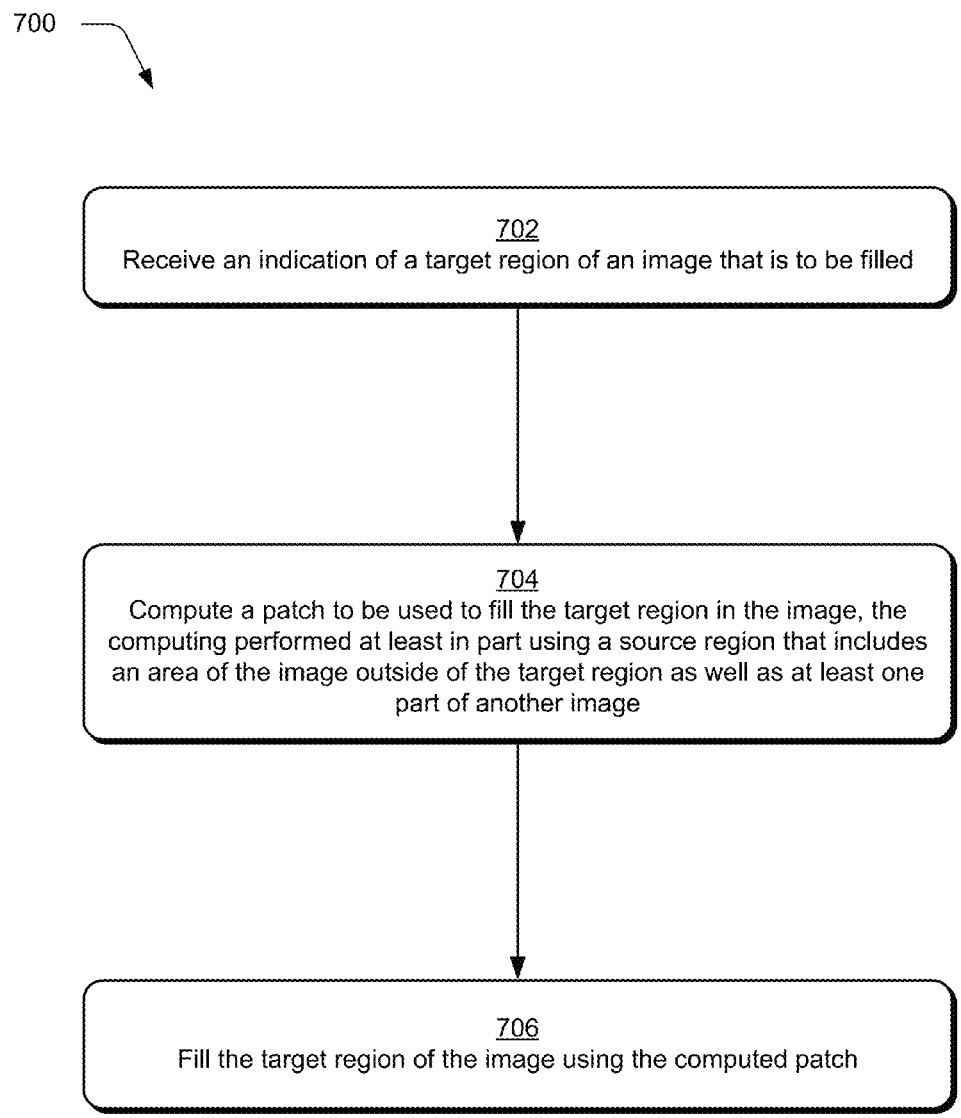
FIG. 7 is a flow diagram depicting a procedure in an example implementation in which a patch is computed using a source region that includes an area of an image outside of a target region as well as another image.

FIG. 7 depicts a procedure 700 in an example implementation in which a patch is computed using a source region that includes an area of an image outside of a target region as well as another image. An indication is received of a target region of an image that is to be filled (block 702). As before, this may be performed in a variety of ways, such as through use of a cursor control device, gesture, voice command, and so on to specify the target region.

A patch is computed that is to be used to fill the target region in the image, the computing performed at least in part using a source region that includes an area of the image outside of the target region as well as at least one part of another image of the image scene (block 704). As before, this may include an area of an image that includes the target region that is outside of the target region. This may also include another image of the image scene, which may be part of a stereoscopic pair. This may also include another image of the image scene that is not part of a stereoscopic pair, such as an image that does not support stereoscopic vision.

The target region of the image is then filled using the computed patch (block 706). In this way, the source region may be increased and thus provide increased richness and variety of information regarding the image scene for the computation of the patch.

Figure 8:
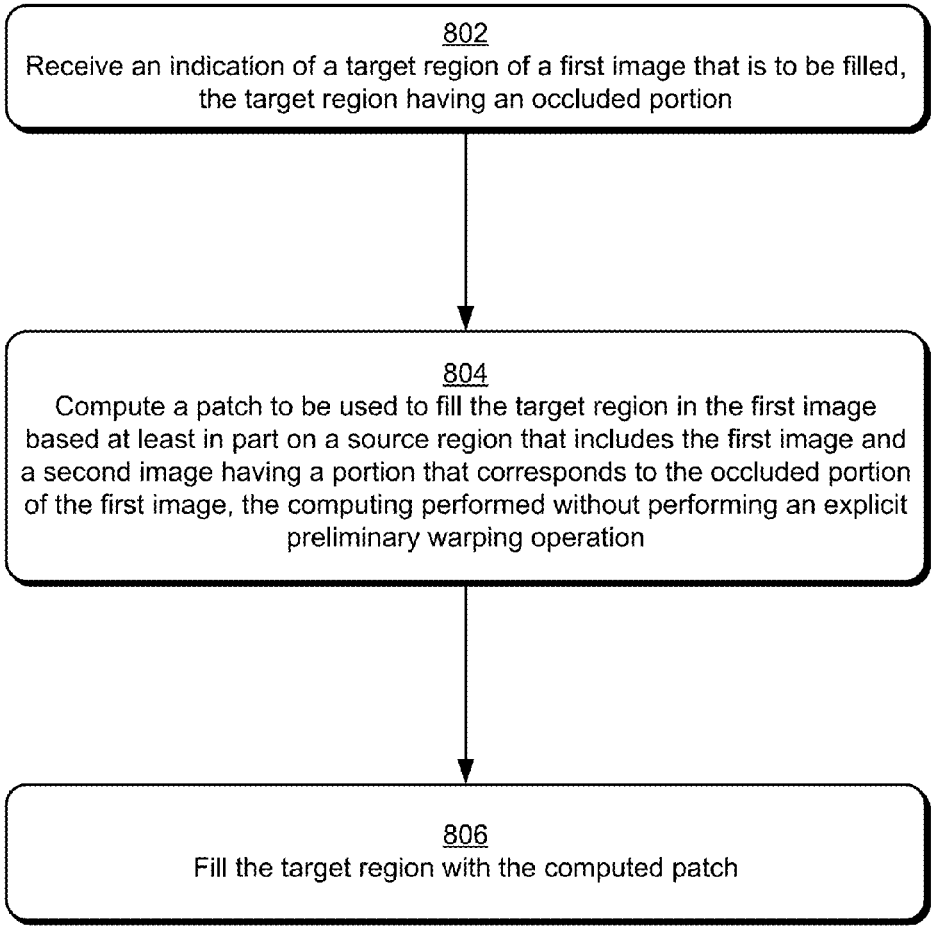
FIG. 8 is a flow diagram depicting a procedure in an example implementation in which a patch is computed to fill a target region that includes an occluded portion.

FIG. 8 depicts a procedure 800 in an example implementation in which a patch is computed to fill a target region that includes an occluded portion. An indication of a target region is received of a first image that is to be filled, the target region having an occluded portion (block 802). The target region, for instance, may include a foreground object that occludes at least a part of another object in the image.

A patch is computed that is to be used to fill the target region in the first image based at least in part on a source region that includes the first image and a second image having a portion that corresponds to the occluded portion of the first image, the computing performed without performing an explicit preliminary warping operation (block 804). In an example that involves object removal, for instance, the portion from the second image that is not occluded may be used as part of the patch for the first image. The second image, for instance, may include a part of the other object of the image that is not occluded by the foreground object, such as in an instance along an edge of an object in a stereoscopic pair of images. Other non-stereoscopic examples are also contemplated, such as for different images scenes that include a similar object (e.g., a particular car), different images of the same image scene, and so on. Further, this may be performed without an explicit preliminary warping operation and therefore may be performed implicitly as part of the computing.

The target region is then filled with the computed patch (block 806), which may be performed to fill a color texture, disparity or depth map, and so on. Other examples are also contemplated without departing from the spirit and scope thereof.

Example System and Device

Figure 16:
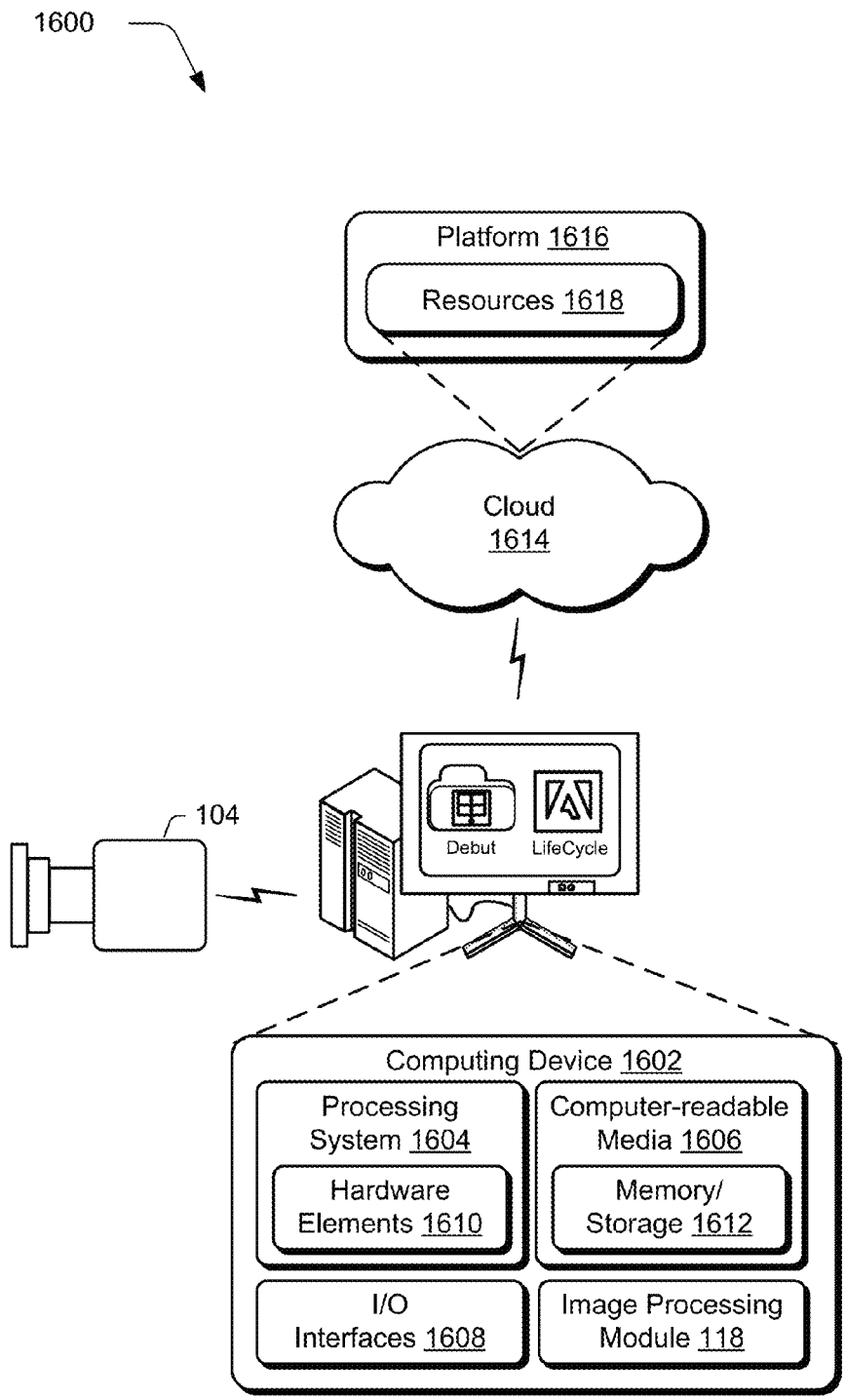
FIG. 16 illustrates an example system including various components of an example device that can be implemented as any type of computing device as described and/or utilize with reference to FIGS. 1-15 to implement embodiments of the techniques described herein.

FIG. 16 illustrates an example system generally at 1600 that includes an example computing device 1602 that is representative of one or more computing systems and/or devices that may implement the various techniques described herein. This is illustrated through inclusion of the image processing module 118, which may be configured to process image data, such as image data captured by an image capture device 104. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources and functions to connect the computing device 1602 with other computing devices. The platform 1616 may also serve to abstract scaling of resources to provide a corresponding level of scale to encountered demand for the resources 1618 that are implemented via the platform 1616. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
   receiving an indication of a target region of a first image that is to be filled, the target region having an occluded portion;
   computing a patch to be used to fill the target region in the first image based at least in part on a source region that includes the first image and based at least in part on a second image having a portion that corresponds to the occluded portion of the first image, the computing performed without performing an explicit preliminary warping operation and by blending a plurality of patches taken from the source region using a blending weight to enforce cross-image consistency between the first and second images, the blending weight being increased for patches that are consistent with their stereoscopic counterparts in the second image; and
   filling the target region of the first image using the computed patch.

2. The method as described in claim 1, wherein the first and second images form a stereoscopic pair.

3. The method as described in claim 1, wherein the first and second images do not form a stereoscopic pair.

4. The method as described in claim 1, wherein the patch includes a color texture.

5. The method as described in claim 1, wherein the computing is also based at least in part on an area of the first image that is outside the target region.

6. The method as described in claim 1, wherein the computing is performed to enforce stereoscopic consistency between the patch and a patch to be used to fill a corresponding target region of the second image.

7. The method as described in claim 1, wherein a patch that does not have a stereoscopic counterpart in the second image is given a minimal, non-zero blending weight.

8. A non-transitory computer-readable storage medium storing program instructions, the program instructions being computer-executable to implement:

receiving an indication of a target region of a first image that is to be filled, the target region having an occluded portion;

computing a patch to be used to fill the target region in the first image based at least in part on a source region that includes the first image and based at least in part on a second image having a portion that corresponds to the occluded portion of the first image, the computing performed without performing an explicit preliminary warping operation and by blending a plurality of patches taken from the source region using a blending weight to enforce cross-image consistency between the first and second images, the blending weight being increased for patches that are consistent with their stereoscopic counterparts in the second image; and filling the target region of the first image using the computed patch.

9. The non-transitory computer-readable storage medium as recited in claim 8, wherein the first and second images form a stereoscopic pair.

10. The non-transitory computer-readable storage medium as recited in claim 8, wherein the first and second images do not form a stereoscopic pair.

11. The non-transitory computer-readable storage medium as recited in claim 8, wherein the patch includes a color texture.

12. The non-transitory computer-readable storage medium as recited in claim 8, wherein the computing is also based at least in part on an area of the first image that is outside the target region.

13. The non-transitory computer-readable storage medium as recited in claim 8, wherein the computing is performed to enforce stereoscopic consistency between the patch and a patch to be used to fill a corresponding target region of the second image.

14. A system comprising:
one or more processors; and
a memory comprising program instructions, the program instructions executable by at least one of the one or more processors to:
receive an indication of a target region of a first image that is to be filled, the target region having an occluded portion;
compute a patch to be used to fill the target region in the first image based at least in part on a source region that includes the first image and based at least in part on a second image having a portion that corresponds to the occluded portion of the first image, the computing performed without performing an explicit preliminary warping operation and by blending a plurality of patches taken from the source region using a blending weight to enforce cross-image consistency between the first and second images, the blending weight being increased for patches that are consistent with their stereoscopic counterparts in the second image; and
fill the target region of the first image using the computed patch.

15. The system of claim 14, wherein the first and second images form a stereoscopic pair.

16. The system of claim 14, wherein the first and second images do not form a stereoscopic pair.

17. The system of claim 14, wherein the patch includes a color texture.

18. The system of claim 14, wherein the computing is also based at least in part on an area of the first image that is outside the target region.

19. The system of claim 14, wherein the computing is performed to enforce stereoscopic consistency between the patch and a patch to be used to fill a corresponding target region of the second image.

20. The system of claim 14, wherein a patch that does not have a stereoscopic counterpart in the second image is given a minimal, non-zero blending weight.

* * * * *